US012505696B1

(12) United States Patent
Kia

(10) Patent No.: US 12,505,696 B1
(45) Date of Patent: Dec. 23, 2025

(54) AI-BASED RACE MANAGEMENT SYSTEM

(71) Applicant: ACTIVE TRACK, LLC, Portland, OR (US)

(72) Inventor: Arash Kia, Portland, OR (US)

(73) Assignee: Active Track, LLC, Portland, OR (US)

( * ) Notice: Subject to any disclaimer, the term of this patent is extended or adjusted under 35 U.S.C. 154(b) by 367 days.

(21) Appl. No.: 17/841,507

(22) Filed: Jun. 15, 2022

Related U.S. Application Data

(60) Provisional application No. 63/299,340, filed on Jan. 13, 2022, provisional application No. 63/210,922, filed on Jun. 15, 2021.

(51) Int. Cl.
*G06V 40/16* (2022.01)
*G06K 7/14* (2006.01)
*G06K 19/06* (2006.01)

(52) U.S. Cl.
CPC ......... *G06V 40/172* (2022.01); *G06K 7/1417* (2013.01); *G06K 19/06037* (2013.01)

(58) Field of Classification Search
CPC .................. G06V 40/17; G07C 1/22
See application file for complete search history.

(56) References Cited

U.S. PATENT DOCUMENTS

2011/0172822 A1*  7/2011  Ziegler .................. B25J 11/008
                                                        318/568.25

\* cited by examiner

*Primary Examiner* — Diane D Mizrahi
(74) *Attorney, Agent, or Firm* — Richard T. Black; FisherBroyles, LLP

(57) ABSTRACT

A system for tracking competitors conducting a race on a track includes multiple object-recognition devices positioned to recognize objects at predetermined locations along the track. The object-recognition devices are configured to recognize at least one physical feature of each of the competitors. A processing device is configured to determine a time at which a competitor reached a selected one of the predetermined locations during the race based on object-recognition data from at least one of the object-recognition devices. A transmitter is configured to transmit to an output device the time at which the competitor reached the selected location during the race.

13 Claims, 12 Drawing Sheets

*Livestream Diagram and Data Flow Explanation*

Livestream Diagram and Data Flow Explanation

Figure 1:

Sorted plastic sheet used for printing QR Codes

Side view of the QR Code substrate

AI-BASED RACE MANAGEMENT SYSTEM

PRIORITY CLAIM

This application claims priority to U.S. Provisional Patent Application Ser. No. 63/299,340 filed Jan. 13, 2022 and U.S. Provisional Patent Application Ser. No. 63/210,922 filed Jun. 15, 2021, the contents of which are hereby incorporated by reference in their entireties as if fully set forth herein.

COPYRIGHT NOTICE

This disclosure is protected under United States and/or International Copyright Laws. ©2022 ACTIVE TRACK, LLC. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BRIEF DESCRIPTION OF THE DRAWING FIGURES

FIGS. 1-12 illustrate first and alternative embodiments of the invention.

DETAILED DESCRIPTION OF THE PREFERRED EMBODIMENT

One of the major fixes that improved our yield had to do with the selection of the form factor for the QR codes. We originally started with printing QR codes on paper. We used medium and heavy weight paper as a base material but if the material (we call it the substrate) was not rigid enough, the QR code read rate would drop. The best read rates are obtained when the substrate is optimally rigid. Other features of the substrate required for better detection are: good contrast between the black color of the QR code pixels and the background color of the substrate, sharp resolution so there is no smearing of ink, and that the materials are lightweight so they are barely noticeable by the runners.

We started by using safety pins to secure the paper substrate QR codes to the runner's garment. This was prior to determining the importance of substrate rigidity. Since the detectors are above the runners and pointed down, the QR codes have to be pointed up (facing the sky) and as flat as possible. So we started with the configuration as shown in FIG. 1.

FIG. 1 shows the QR code on the shoulder with a safety pin on each side of the shoulder. However, even with a new QR code, the paper already looks warped and somewhat bent. Wavy substrates and bent paper impact the read rate negatively. Concerns with the reliability of the paper substrates and the lack of a professional look forced us to change the substrate. So we searched for alternative substrates and decided to test rigid thin PVC and plastics. We zeroed in on, but are not limited to, using Styrene and Sintra for use as a substrate. They both have the rigidity that we were looking for and both come in sheets that could be cut down to size. Both also produce sharp contrasts that we wanted. In regards to cost, Styrene (at, optimally, but not limited to being 0.5 mm thick) ends up being 1.1 penny per substrate. Sintra is a bit more expensive. Styrene comes in almost a bleached white color which is great for contrast. Sintra is a bit yellowish. For these reasons we picked Styrene, but we are not limited to color.

Figure 2:
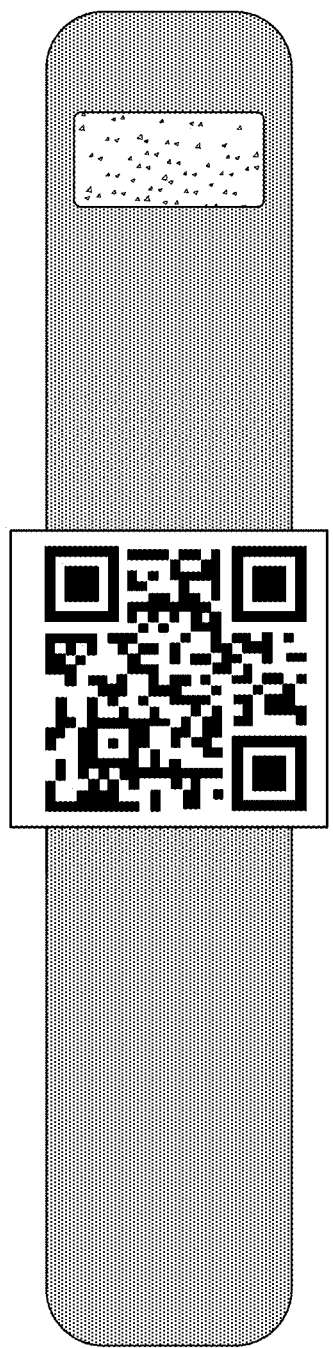

Next, we had to do something about the safety pins, considering those runners who like to run shirtless. We decided to try KT tape which is often used by beach volleyball players. On TV, the tape seems to stick to the volleyball players in the hot sun even when the players were sweating profusely. We tested the tape on different fabrics and it worked really well. It turned out to be a great option to attach the QR code to the runner. In one embodiment of the invention, FIG. 2 shows a strip of KT tape with the QR code glued on to the top of the KT tape. The adhesive part of the KT tape is on the other side of the tape and is covered by wax paper. The printed substrate shown is, in one embodiment, about 2.2"×2.2". The QR code itself, in this embodiment, is approximately 2.1"×2.1" and there is some extra white space used as a border around the QR code. In our testing we are currently using, but are not limited to using 4"×2" strips of KT tape. The strip of tape shown in FIG. 2 is 10" long. The KT tape is the most expensive part of the QR code design so we had to shorten it down from 10" and discovered 4" is plenty for a secure attachment to people, but we are not limited to these size constraints.

In one embodiment of the invention, to attach the QR code to the KT tape, we hot glued a small strip in the middle of the styrene (after the styrene was printed on) and placed the back side of the QR code on top of the KT tape.

Figure 3:
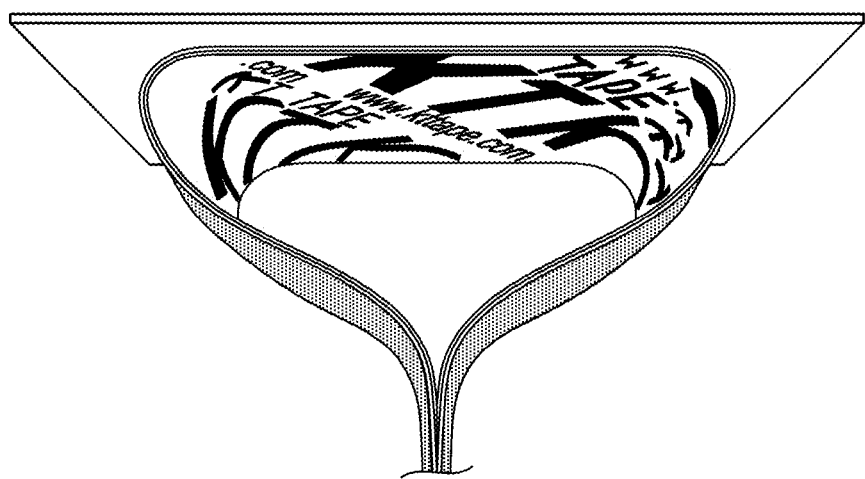
Figure 4:
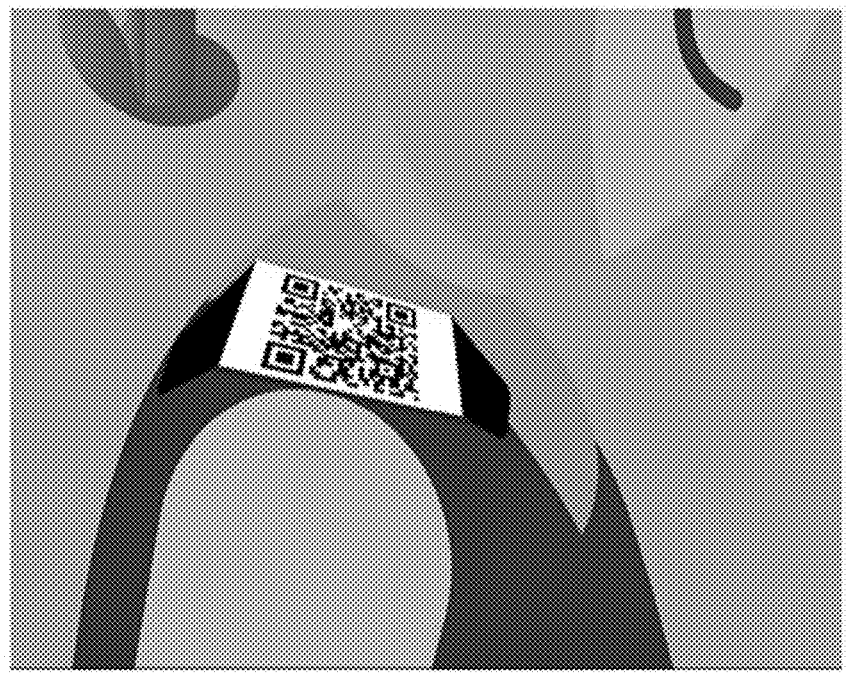

See FIGS. 3 and 4 for how the tape would look when the QR code is glued to the top of the tape. In one embodiment of the invention, to attach the QR code to the runner's shoulder, the best results come from placing the QR code on top of the shoulder and then attaching each end of the tape to a different side of the runner's shoulder (sort of like a Band Aid).

Figure 5:
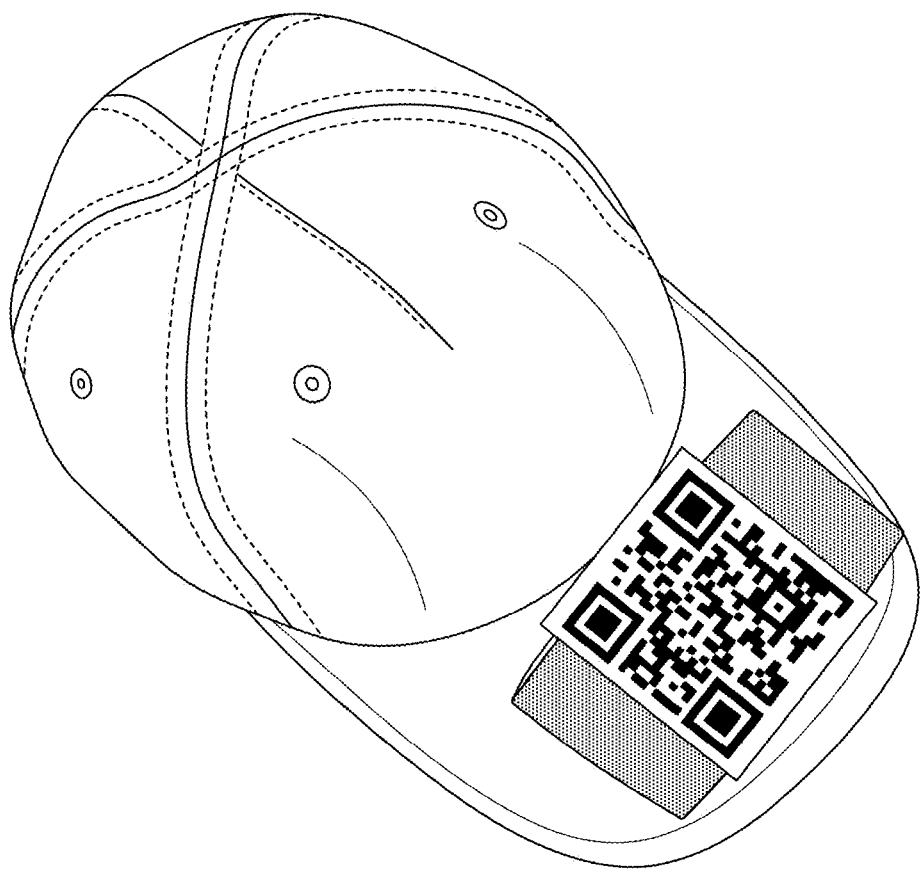
Figure 6:
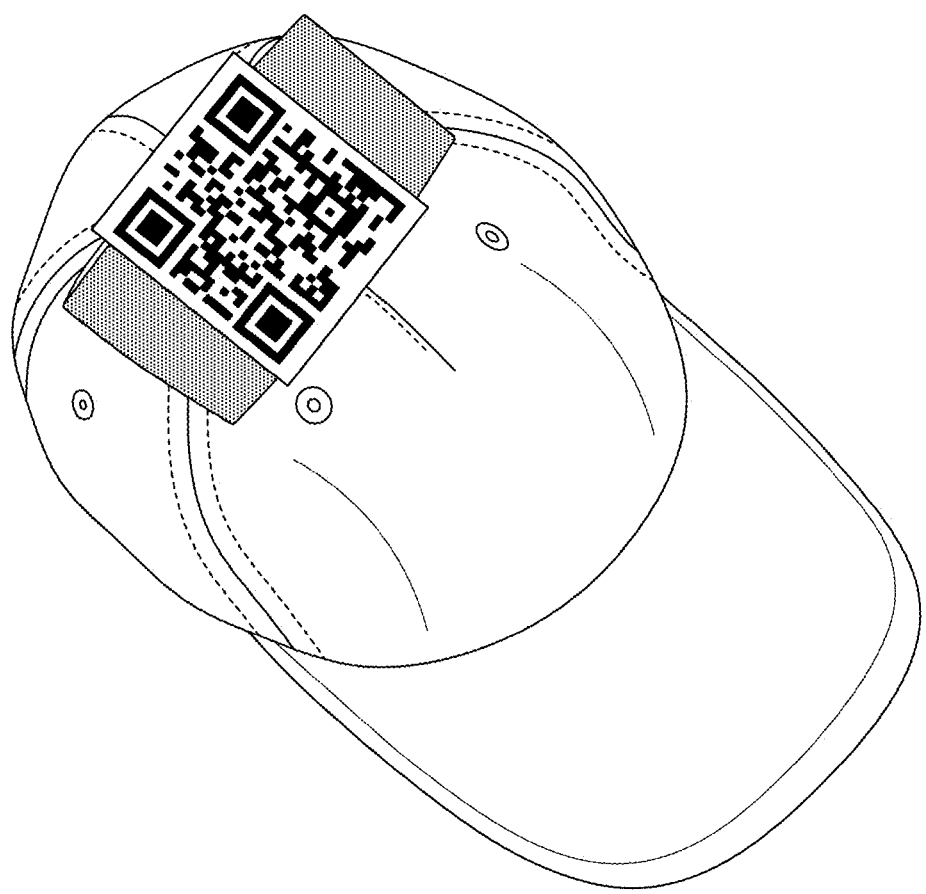

There are other ways of placing the QR code on a runner. In one embodiment of the invention, if the runner is wearing a cap, the QR code be placed on the bill of their hat or on the very top—as illustrated in FIGS. 5 and 6.

The same KT tape can be used for many different applications.

Figure 7:
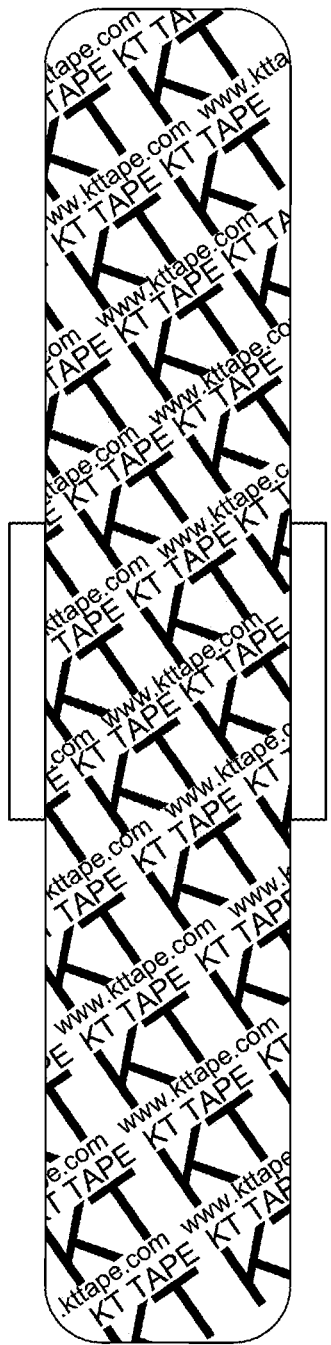
Figure 8:
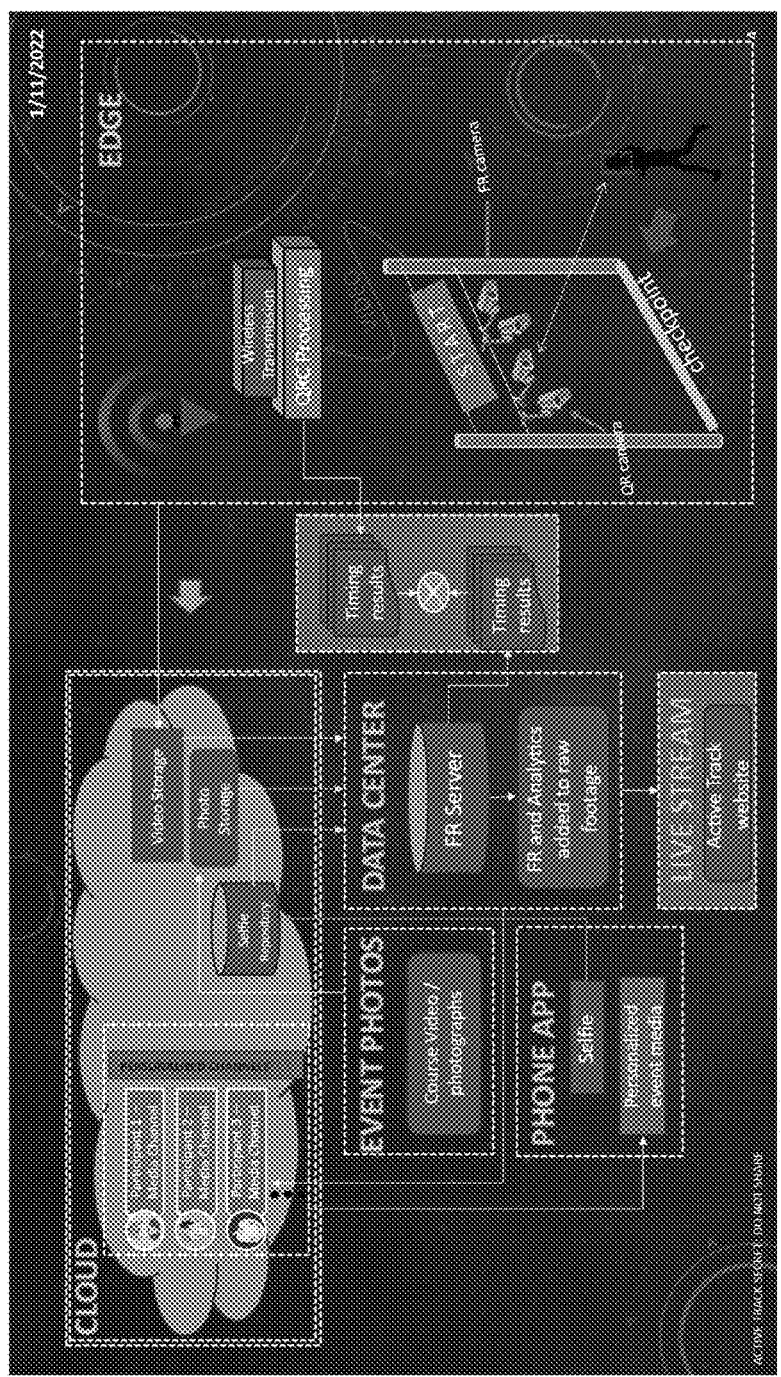
Figure 9:
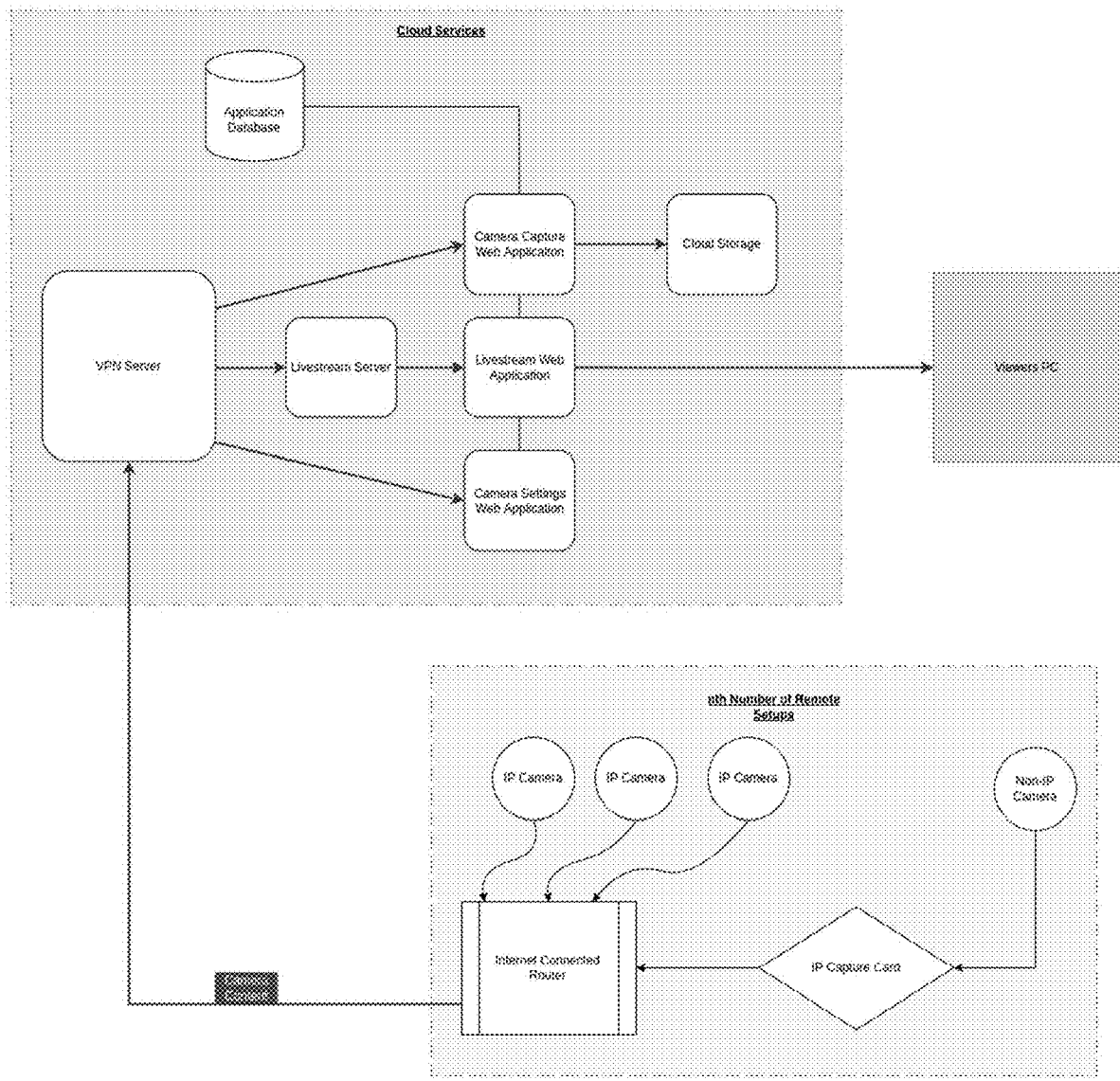
Figure 10:
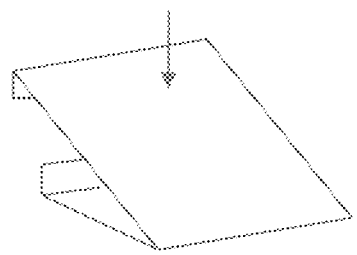
Figure 11:
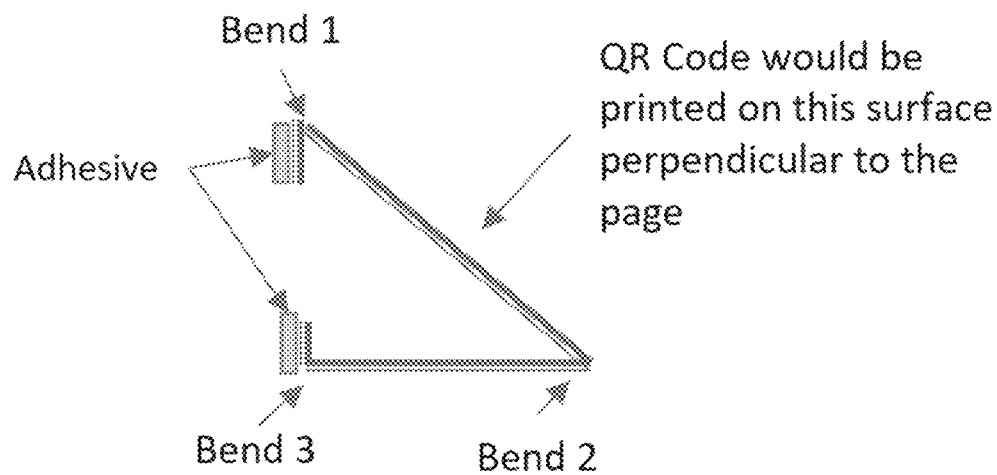
Figure 12:
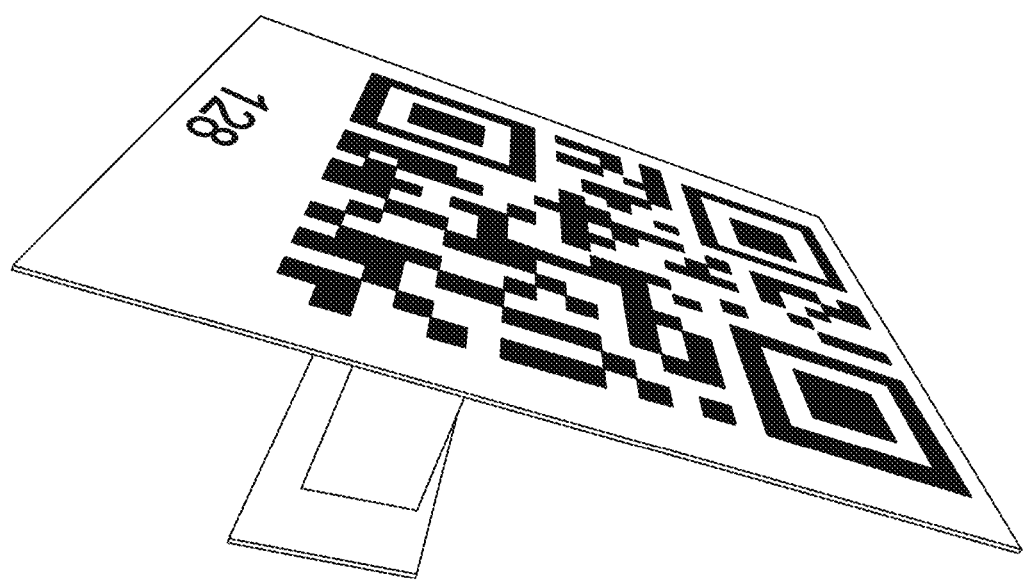

The KT tape's adhesive side will be, in one embodiment, covered with, for example, waxed paper. The waxed paper must be removed to expose the adhesive for attachment to the hat, shirt, or human skin, as illustrated in FIG. 7.

Scanners and cameras will be inside a contraption attached to a lighting truss that will be, in one embodiment, approximately 8 feet high.

Because QR codes don't have to be perfectly perpendicular to the scanner's line of sight, the codes could be tilted to 25-30 degrees on any side and the scanners would still provide a good read.

The tilt refers to the shifting forward of the QR code on the shoulder seam of the participant. Attachment of the QR code to the top of the shoulder, although it provides a functional solution to identifying the person wearing it, does not carry the best look with it. Concerns about market acceptance led us to position the QR code placement about 1 inch forward of the top of the shoulder. A 1" shift in the QR code position would eliminate the perfect scan angle of the QR code with the overhead cameras. QR code scan rate was impacted significantly with the forward shift of the code. A new substrate or form factor had to be designed for the codes to make them point more up than they were.

Two solutions were proposed to account for the drop in the angle of the QR code. In the first solution a thin strip of foam on the bottom side of the codes to make the stick out and hence become more visible to the overhead cameras.

The exposed side of the foam towards the participant has adhesive covered with some wax paper that would be removed right before the code is attached to the participants. The figure below shows such a construction.

In the participatory endurance event business, there are race calendars, registration services, and timing companies with data that doesn't get handed down seamlessly, efficiently, and in a quick, reliable, and streamlined manner. That means sign up data and timing data are not processed as if they belong to the same system. There are manual handovers and spreadsheets requiring human intervention along the way.

One process starts with a participant searching for an event, registering by entering personal data and contact information, getting a receipt, printing it and bringing the receipt to the expo the day before the race. Packet pick-up is typically never fast, efficient, or connected. There is human intervention and spreadsheets with names to cross off as people check in. After check-in, the participant is given a race number and that number is recorded so that the name of the participant stays associated with the race number. Up to this point, the process typically has been slow, involved, and not connected. There is also human intervention with connecting the race number with the name. On the race course, the timing is done through the person's name being tied to a race number with an RFID chip that is programmed to have the electronic code as the actual number on the race bib.

As such, each step of the process requires a number of different data collected all for the sake of identifying, charging, assigning a race number, and timing a participant on the course. There are the personal information steps when searching and registering for a race, there is check-in with a driver's license or another ID, and then there is a connection to the RFID race bib.

Prior generations using RFID are well-known in the prior art involving the tracking/timing of participants in athletic events. Previous systems encode IDs into chips that then are placed onto running bibs or race numbers. Manufacturing of RFID, encoding of the RFID tags, and printing of the RFID tags onto race bibs all cost considerable amounts of money. Other embodiments of the art utilize active battery powered RFID tags, which provide a stronger signal from the bib and a longer range for detection. The electronics cost money, pollute the environment, create many man-hours of overhead, and create unnecessary waste. In addition, the encoding process is a long and time-consuming process and requires many man hours to manage. RFID timing systems use a chip encoded with a known ID that often matches the bib number. These systems require RF based antennas to detect and capture IDs going over them.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices and can be used to implement or otherwise perform practical applications. The term "detection" refers to detecting a face in the scene displayed on the camera display. The term "identification" refers to identifying the person whose face was detected by the camera.

In an embodiment, the cameras can capture and upload the raw race course data to one or more Cloud servers through an internet connection. The connection could come through cellular, cable, Wi-Fi, connected or wireless, or through any other communication channel and protocol where the images from the cameras are sent to a cloud server for processing. In this embodiment, the need for an onsite server or laptop as a device to identify and assign time stamps to each recognized face, would be eliminated. This processing of data, which includes detection and identification of runners and recording of crossing time at the respective checkpoint, may all transition to the cloud server. An advantage of this method would be less equipment to carry around and use of a central reliable source for processing of a critical function of the timing system.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

In the second proposed solution to make the QR codes more visible to overhead cameras, the bottom part of the code is sorted and bent 90 degrees relative to the surface of the QR code. The same type of adhesive is used to make the tags stay on when participants are running.

As used herein, a process that is performed "automatically" may mean that the process is performed as a result of machine-executed instructions and does not, other than the establishment of user preferences, require manual effort.

An embodiment of the invention involves the timing and tracking of participants in athletic events. As described below, the invention delivers richer content, enhances communication through visual display of artificial-intelligence video feed and analysis thereof. Video content can be delivered to a participant's family, providing race course images at the finish line in real time. In an embodiment, bibs have no chips built in. Participants are identified using face recognition cameras that identify the runners by matching their facial features to a known data set of participants who have been placed into the timing systems as a list of known participants. Additionally, the cameras can read the bib numbers and record them as a second method of identifying the participants.

One or more embodiments of the invention are tag-less and unlike the RFID timing system don't require anything hanging from the runner that is emitting signals or modulating fields. There are also no antennas on the street or other RF fields that participants have to run through.

A preferred embodiment of the invention times and tracks participants in events such as running races (i.e., marathons, half marathons, etc.) through artificial intelligence so that a better participant experience is provided. An embodiment provides richer content, faster delivery for the participants, and less overhead, less cost, and higher accuracy for the race directors and race timers.

Referring to FIG. 1, a process and system according to an embodiment includes defining a track 10 on which competitors 20 will conduct a race. Multiple object-recognition devices 30, such as cameras, are positioned at predetermined locations along the track 10. The object-recognition devices 30 are configured to recognize at least one physical feature of each of the competitors 20, such as, for example, the face of the competitor. Based on object-recognition data received by a processing device 40, such as a server, from at least one of the object-recognition devices 30, a time at which a competitor 20 reached a selected one of the predetermined locations on the track 10 during the race is determined. The time at which the competitor 20 reached the selected location during the race is then transmitted via a transmitting device 50 to an output device 60, such as a smart phone using Bluetooth, Wi-Fi, cellular or the like. In an alternative embodiment, the processing device 40 includes the transmitting device 50.

Referring to FIG. 2, a process and system according to an embodiment includes defining a track 110 on which competitors 120 will conduct a race. A respective different quick response (QR) code 130 is attached to each of the competitors 120. Each QR code 130 identifies the competitor 120 to which it is attached. One or more reader devices 140 is positioned at one or more locations along the track 110. The one or more devices 140 are configured to read the QR code 130 attached to each of the competitors 120. Based on data received by a processing device 150, such as a server, from at least one of the reader devices 140, a time at which a competitor 120 reached a selected one of the locations on the track 110 during the race is determined. The time at which the competitor 120 reached the selected location during the race is then transmitted via a transmitting device 160 to an output device 170, such as a smart phone using Bluetooth, Wi-Fi, cellular or the like. In an alternative embodiment, the processing device 150 includes the transmitting device 160.

A process according to an embodiment begins by capturing images of participants during the registration/packet pickup of the event. The participant may stand in front of one or more cameras that snap a picture to compare against images collected on the event course. On event day, the camera can perform a tripwire function where a runner's time stamp is registered and saved on a nearby server when any part of the runner's body crosses over a line drawn on the monitor of the hardware connected to the camera. The imaginary line could be drawn on the monitor screen of the attached hardware. The line could be one and the same as the starting line by drawing it right on top of where the actual starting line is geographically located. Cameras perform facial detection and send the detected images to a nearby connected server or to a cloud server for storage and subsequent identification. The identification process is performed by comparing the biometric data of a participant's face to the many entered into the database during the registration or the check-in process.

One or more embodiments include bringing artificial intelligence to the participant's experience at a participatory athletic event such a marathon or a triathlon. In an embodiment, participant's biometric data, which can include a combination of facial features unique to a single person, can be captured into a participant database during packet pickup, or even sooner when the participant registers for an event through a smart phone app. On the day of the event, at the starting line, the embedded face recognition technology in the camera can identify the participants at the start line of a race. Frames of video from the start line can be saved on a network server and then rescanned for any faces that may not have been detected by artificial intelligence in the cameras. The group of participants not identified or even not detected at the start line can be detected when they cross a later checkpoint along the event course. For this reason, a rescan of the start line may be necessary against participants detected at a later checkpoint. Any participant crossing a checkpoint who does not have a start time can be tagged as a participant who was possibly missed at the start line. Additional graphic tools and methods can be utilized to match the known misses against the captured video of start line participants. These graphic tools can manually connect a detected participant to an individual at the start line.

In an embodiment of the imaging application of this technology, a participant would be identified along the event course and actual video of the participant plus positional and displacement information could be transmitted to the participant's family. Additionally, images of the participants could be taken and stored on the cloud for later viewing and purchase. At the finish, a kiosk equipped with an artificial-intelligence camera, can identify a participant in front of the kiosk and offer to sell them still images and their finish line video clip from the race course. The participants could have the option of paying for and printing the images in real time and saving the hassle of ordering online and having the pictures delivered to their home.

In addition, at the finish line each participant can be profiled for the products they wear, gear they use, and some information about their personal preferences which could be saved for promotional purposes. Each finisher can receive a completion time for the distance that was travelled, plus split times at any checkpoint along the way.

In an embodiment of the usage of the facial recognition data, the same facial data used for identification of participants along the event course, or at the photo-video kiosk, would be used to register a participant for an event. In one embodiment, the registration process would use a smart phone application, capable of showing and filtering through a calendar of participatory athletic event, and allowing the user to register for a desired event by selecting an event from the calendar of events. Upon the request to register, the person's mailing address and contact information would be recorded and the person would be charged an entry fee granting them entry to participate in the event. This same facial biometric data would be used during the participant check-in, on the course, and at the photo-video kiosk.

An embodiment of the invention includes a method of applying artificial-intelligence technology to timing running and endurance races, customized software, and algorithms to handle missed individuals. Start line images at a rate of 20 to 30 frames per second, and would rescan the start line images in a mission critical approach where a person detected at a later checkpoint could be targeted for detection at the start line. The missed start line participants would be identified through the use of video data from checkpoints midway through the course, and the finish line video. Through the utilization of filtering mechanisms and search routines, participants of the same gender, same clothing style, shoes, headwear, apparel color, or any other identifiable feature could be tracked down.

In another embodiment, the camera could capture the participant bib number and use it to identify the participant. Each participant could be assigned a bib with a unique number on the bib that the artificial intelligence cameras of the timing system would be able to read and understand. To date no such system exists in the running industry where cameras capture bib numbers and identify participants. Both face recognition and bib number capture can be used to make sure the rate of identification is maximized.

An embodiment can handle all the steps to make the entire process efficient and streamlined. An embodiment provides a new and modern registration service with a list of possible events to register for where each event may have a mark that would be identifiable with a smart phone (e.g., a QR code). An embodiment might include an application, such as for a smart phone or other portable electronic device, in which the registrant may scan the QR code and get registered for the event. Then during expo check in, the participant is again identified because their picture was saved into the "cloud" through the use of smart phone application. In an embodiment, the participant would be photographed with the artificial intelligence cameras right after a bib number is handed to the participant. The camera, whether on the kiosk or a smart phone admin phone, would be able to read the assigned bib number and record it. Other checks and balances would be performed to verify the participant would be running in the correct event. In this embodiment the registration process would be streamline, sped up, and would again tap into the same data as registration, image search, and timing system identification. All the long lines at check in would disappear and the same data is shared among the many systems and steps of the process.

In the process according to an embodiment, if someone shows up without a smart phone, an embodiment may include providing admin smart phones that could register a third party into the race or get an athlete checked in. One step could include having the athlete have their image captured while holding their bib for identification on the race course. This approach would let the timing system update the face image so the latest face image could be used for detection on the race course.

One approach according to an embodiment could put a QR code matching the runner bib number on the runner garment and then read the code optically right at the start line.

The cameras can identify an object as being a human, they can watch it cross a boundary, and they can do facial recognition on it. The cameras may have a time delay associated with them for determining a humanoid from a car or a tree. When the tree moves in the wind, they ignore the movement. The camera can do facial recognition and boundary crossing of the start line at the same time. The same camera could have the ability to read bib numbers. Such a function is incorporated into the AI of the camera.

AI-Based Race Management System

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

An embodiment of the invention provides the delivery of a reliable, continuous, and high-resolution video from an event course to the cloud for storage and streaming purposes. Event course video is the common requirement for all the different deliverables of a Race Management System according to one or more embodiments, and without a clean video, the system may underperform and may not deliver on its goals and objectives. One or more embodiments include live streaming for the Race Management System. An embodiment may benefit from Facia recognition and QR code scan capability. An embodiment may include a live stream from a race course using multiple (e.g., four) stationary cameras and a cinematic drone that can fly around the course.

The field or edge cameras according to one or more embodiments can be connected to communication equipment that will boost the signal, enhance the range, and utilize a Virtual Private Network (VPN) router. This equipment can transmit a high-definition video from a remote location, whether on dry land or a body of water, to a cell tower that might be over 20 miles away. One condition for long range transmission may be a clear line of sight to the cell tower.

FIG. 1 summarizes the capabilities of one or more embodiments. One or more embodiments will include a Live Stream release, and facial recognition turned on. Facial recognition activation can be utilized for identification of the event participants on the race course. The participants who are identified can have their videos grouped together and presented to them in channels on the cloud. Participants who request channelization of their event course videos may provide a selfie to one or more embodiments which would get uploaded into the facial recognition server. In return, one or more embodiments will provide to each participant a link to their video channels. One or more embodiments will also have QR code scan capability. This feature along with facial recognition will provide two independent methods of participant identification.

One or more embodiments combine race management, event-related social media, curated content generation/distribution, live event production, and streaming into a single ecosystem. With curated content captured live on race day, personalized channels are created serving unique content to each participant. To access this curated content each race participant can create an account on the Web application which will be the hub of all their video, photo, and race stats content. Race administrators are provided with all the tools necessary for capturing and livestreaming video content remotely.

Data Flow

1. At (n)th number of locations we have remote camera systems. These systems consist of 1 or more cameras (both IP and Non-IP) connected to a local network that has internet access. Video content is sent through the internet connection to a VPN Server hosted in the cloud.

2. In an embodiment, all remote setups are connected to this VPN Server allowing them to communicate with each other as well as anything hosted in the cloud. The VPN Server is the main place where any application or system interface can access the video content coming from connected cameras.

3. From the VPN Server the content heads to three separate locations.

The Livestream Server where raw video content is turned into stream-able content. Next to a Livestream web application that hosts the content. Users are then able to login to their account and view content they have access to.

The Camera settings web application, which allows race administrators to control the camera settings.

The Camera Capture Web Application where the content is captured and saved in cloud storage.

4. Each Web application is connected to the Application Database which stores metadata about the video content as well as accounts and user permissions.

Livestream Setup Documentation
Remote Setup/Gateway Node
Cameras
  IP (Internet Protocol) cameras used to capture footage at remote locations.
Drone
  Drone used to capture footage at remote locations.
Internet Connected Router
  Mobile network router which connects the remote system to the internet via cellular network. Information from the devices that are connected to the VPN Router is sent to the cloud via the internet connection provided by this device.
Antenna for Internet Connected Router
  Wide range, omni directional antenna.
Antenna Booster
  Boosts the signal of antenna.
VPN Router
  Router that is connected to the VPN server in the cloud. All cameras connected to this router are visible on the VPN Server allowing communication/data transfer to and from connected devices.
Power over Ethernet Switch
  Network switch used to connect the IP cameras to the VPN router. It also provides power to the cameras.
Video Encoder Capture Card
  Capture card that converts IP camera signals into IP signals, which is then connected to the VPN router.
Cloud Services
Cloud Storage
  Cloud storage solution used to save data used in the system.
Application Database
  Database that's used to store data about video content as well as user accounts and permissions.
Camera Capture Web Application
  Web application which allows a race admin to start and stop capture of cameras connected to each remote system through a UI interface. Grabs video content from cameras connected to VPN server and sends commands to cameras.
Camera Settings Web Application
  Web application which allows race administrators to manage settings for connected cameras.
VPN Server
  VPN server which connects all the cameras on the remote system with all the components in the cloud. Video information flows from the VPN Clients (VPN connected routers) to this server where the Camera Capture web app and the Livestream Server can access it. It also allows us to connect to the cameras remotely and change settings.

Livestream Server

Ingests video content from the remote IP cameras via the VPN server and turns it into stream-able content that is sent to the Livestream web app.

Livestream Web Application

Web application which allows users to log in and view the livestream from select cameras. Takes in video content being served by the Livestream Server and presents it through a UI that allows users to select livestream feeds they have access to.

The video used for object recognition, plus video from other ground cameras and drones, could be livestreamed using one or more streaming protocols and wireless communication technologies that would connect the streaming service to a cell tower. Through the use of proper antennas and service from providers, video from remote locations where cell service might not even be available, could be streamed live on the internet. The details of the setup and the protocols used to transfer the data are documented below.

Livestreaming from a Mass Participaction Event

The transmission of video from the field to a central processing location is a necessary step in identifying people and objects in a video clip. Often there is no local area network available to transfer the video to a processing location. A wireless network detailed here has been used to transfer video from the field to the internet in real time and displayed for the fans of the event to watch.

In our embodiment of such a system, a pelican case incorporating a power source, an encoder for the drone, a switch box, and a wireless LTE router were connected together to capture video from two ground cameras, a drone, and transmit all the video content to the cloud. The router is connected to 4 MIMO directional antennas outside of the pelican case which transfer all the video to a cell tower as far as 15+ miles away.

The video from the field antennas is received and stored in the cloud, and forwarded to a Facial Recognition (FR) engine to process. In our initial process, the FR engine was placed in a secure location on a server that would receive the video from the internet. However, the FR engine could also be hosted locally on the field and utilized as soon as the video is captured. In this method, the identification step could happen before the video is transmitted from the field to the cloud. The added benefits would be that people in the camera field of view could be identified prior to display on the internet and that information plus other rich content could be added to the video for display on the host site.

Regardless of where FR is performed on the course video, paying customers will have video clips placed into cloud folders where a separate folder is reserved for each paying customer. Every time a paying customer appears in the video, that video clip is cut and placed into the cloud folder where the person's video clips are maintained and collected.

Once the FR engine processes all the course video and bins out every customer's video into their respective folder, another application pieces together the video clips and creates a larger video of each person's journey past the checkpoint where they were recorded and identified. A sample of what this product would look like is on the ActiveTrack website at: http://www.active-track.com/services/#yp-row under the Video Package section.

The finished video will be placed into the customer's account on www.Active-track.com where it could be downloaded. The technology that pieces together each customer's video, relies on static video clips that might represent the area, iconic landmarks along the course, the leaders of the race, or anything else that could be shared with all the fans and participants of the events. These static shared video clips are mixed in with each runners' customized video clips to create the final video that is sold to each customer.

APPENDIX TO THE SPECIFICATION

Active Track Live Stream is a full stack live streaming system for broadcasting races, marathons, and all sorts of events. At its core: it pulls video feeds from, for example, but not limited to: IP cameras via a Virtual Private Network (VPN) hosted in the cloud, and encodes these feeds to be broadcast on a website.

One preferred embodiment of aspects of the invention entitled ACTIVE TRACK LIVE STREAM DOCUMENTATION, Release 0.0, is attached as APPENDIX A.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. An artificial-intelligence based race management system, comprising:
    a remote camera system comprising one or more cameras connected to a local network having internet access and configured to generate video images of participants while competing in a race;
    a VPN server connected to one or more of the one or more remote cameras and configured to allow the remote cameras to communicate with each other and with anything hosted in the cloud;
    a livestream server for converting the video images from the remote camera system into stream-able content;
    a web application configured to allow race administrators to control the camera system settings:
    a camera-capture web application configured to capture and to store the stream-able content; and
    a device configured to
        identify one of the participants, and
        recognize a face of the identified one of the participants in the streamable content,
        offer for sale at least a portion of the streamable content that includes the face of the identified one of the participants.

2. The artificial-intelligence-based race-management system of claim 1 wherein the device includes a kiosk.

3. The artificial-intelligence-based race-management system of claim 1 wherein the device is configured to identify the one of the participants by:
    capturing an image of the face of the one of the participants;
    comparing the captured image of the face to stored images of faces of participants in the race;
    determining which of the faces of the participants best matches the face of the one of the participants; and
    identifying the one of the participants as the participant whose face best matches the face of the one of the participants.

4. The artificial-intelligence-based race-management system of claim 1 wherein the device is configured to identify the one of the participants by:
    capturing an image of the face of the one of the participants;
    extracting facial biometrics data from the captured image;
    comparing the extracted facial biometrics data to stored facial biometrics data related to participants in the race;

determining which of the stored facial biometrics data best matches the extracted facial biometrics data; and identifying the one of the participants as the one of the participants in the race whose facial biometrics data best matches the extracted facial biometrics data.

5. The artificial-intelligence-based race-management system of claim 1 wherein the device is configured to identify the one of the participants by:

capturing an image of the face of the one of the participants;

extracting facial features from the captured image;

comparing the extracted facial features to stored facial features related to participants in the race;

determining which of the stored facial features best matches the extracted facial features; and identifying the one of the participants as the one of the participants in the race whose facial features data best match the extracted facial features.

6. The artificial-intelligence-based race-management system of claim 1:

wherein the device includes a touch screen configured to:

display the at least a portion of the streamable content offered for sale; and allow the identified one of the participants to select for purchase at least a subportion of the at least a portion of the streamable content offered for sale.

7. The artificial-intelligence-based race-management system of claim 1 wherein the device is configured to:

receive, wirelessly, images from third-party image-capture devices;

recognize a face of the identified one of the participants in at least one of the images;

offer for sale the at least one of the images in which the device recognized the face of the identified one of the participants.

8. A method, comprising:

generating, with one or more cameras, video images of participants while competing in a race;

allowing the one or more cameras to communicate with each other and with an item hosted in the cloud;

converting the video images from the one or more cameras into streamable content;

allowing race administrators to control the one or more cameras;

capturing and storing the stream-able content;

identifying one of the participants;

recognizing a face of the identified one of the participants in the streamable content; and offering for sale at least a portion of the streamable content that includes the face of the identified one of the participants.

9. The method of claim 8 wherein identifying one of the participants includes:

capturing an image of the face of the one of the participants;

comparing the captured image of the face to stored images of faces of participants in the race;

determining which of the faces of the participants best matches the face of the one of the participants; and identifying the one of the participants as the participant whose face best matches the face of the one of the participants.

10. The method of claim 8 wherein identifying the one of the participants includes:

capturing an image of the face of the one of the participants;

extracting facial data from the captured image;

comparing the extracted facial data to stored facial data related to participants in the race;

determining which of the stored facial data best matches the extracted facial biometrics data; and identifying the one of the participants as the one of the participants in the race whose facial biometrics data best matches the extracted facial biometrics data.

11. The method of claim 8 wherein identifying the one of the participants includes:

capturing an image of the face of the one of the participants;

extracting facial features from the captured image;

comparing the extracted facial features to stored facial features related to participants in the race;

determining which of the stored facial features best matches the extracted facial features; and identifying the one of the participants as the one of the participants in the race whose facial features data best match the extracted facial features.

12. The method of claim 8 wherein identifying the one of the participants includes:

displaying, on a touch screen, the at least a portion of the streamable content offered for sale; and allowing the identified one of the participants to select for purchase at least a subportion of the at least a portion of the streamable content offered for sale by touching a region of the touch screen displaying the at least a subportion.

13. The method of claim 8, further comprising:

receiving, wirelessly, images from third-party image-capture devices;

recognizing a face of the identified one of the participants in at least one of the images; and offering for sale the at least one of the images in which the device recognized the face of the identified one of the participants.

* * * * *